United States Patent
Larochelle et al.

(10) Patent No.: US 12,454,226 B1
(45) Date of Patent: Oct. 28, 2025

(54) LADDER-SECURING BRACKET ASSEMBLY FOR A VEHICLE

(71) Applicants: Emmanuel Larochelle, Quebec (CA); Patrick Giroux, Quebec (CA); Denis Giroux, Quebec (CA)

(72) Inventors: Emmanuel Larochelle, Quebec (CA); Patrick Giroux, Quebec (CA); Denis Giroux, Quebec (CA)

( * ) Notice: Subject to any disclaimer, the term of this patent is extended or adjusted under 35 U.S.C. 154(b) by 0 days.

(21) Appl. No.: 18/943,700

(22) Filed: Nov. 11, 2024

(51) Int. Cl.
B60R 9/048 (2006.01)

(52) U.S. Cl.
CPC .................. B60R 9/0485 (2013.01)

(58) Field of Classification Search
CPC .................................................. B60R 9/0485
See application file for complete search history.

(56) References Cited

U.S. PATENT DOCUMENTS

| | | | | |
|---|---|---|---|---|
| 5,651,484 | A * | 7/1997 | Fugman | B60R 9/0423 224/310 |
| 5,806,905 | A * | 9/1998 | Moore | B60R 9/00 296/3 |
| 6,142,349 | A * | 11/2000 | Roberson | B60R 7/14 224/558 |
| 6,290,113 | B1 * | 9/2001 | Plyler | B60R 9/0485 224/570 |
| 6,929,162 | B1 * | 8/2005 | Jordan | B60R 9/0485 224/570 |
| 8,678,329 | B1 * | 3/2014 | Bryant, Sr. | B62B 5/0083 280/645 |
| 2003/0178456 | A1 * | 9/2003 | Deakin | B60R 9/0485 224/325 |
| 2005/0189174 | A1 * | 9/2005 | Stout | E06C 7/50 182/127 |
| 2009/0096236 | A1 * | 4/2009 | Hawley | B60R 9/00 296/3 |
| 2017/0197554 | A1 * | 7/2017 | Rouleau | B60R 9/0485 |

* cited by examiner

*Primary Examiner* — Derek J Battisti
(74) *Attorney, Agent, or Firm* — BCF LLP

(57) ABSTRACT

A ladder-securing assembly for a vehicle is presented that includes a bracket configured with a square U-shaped cross-sectional profile and a lateral width sized to accommodate a width of a standard ladder rung, a top surface configured with top side retention holes to receive retention pins inserted therethrough, a bottom surface configured with bottom side retention holes to receive the retention pins inserted therethrough and attachment holes to accommodate bolts for fixedly attaching the bracket to a plane surface of the vehicle, a spacing arranged between the top and bottom surfaces and spanning across the lateral width of the bracket and configured to slidably receive the standard ladder rung, and a retention pin structure containing a retention pin holder configured to releasably lock the retention pins inserted through the top side and bottom side retention holes of the bracket to secure the at least one ladder rung in place.

9 Claims, 4 Drawing Sheets

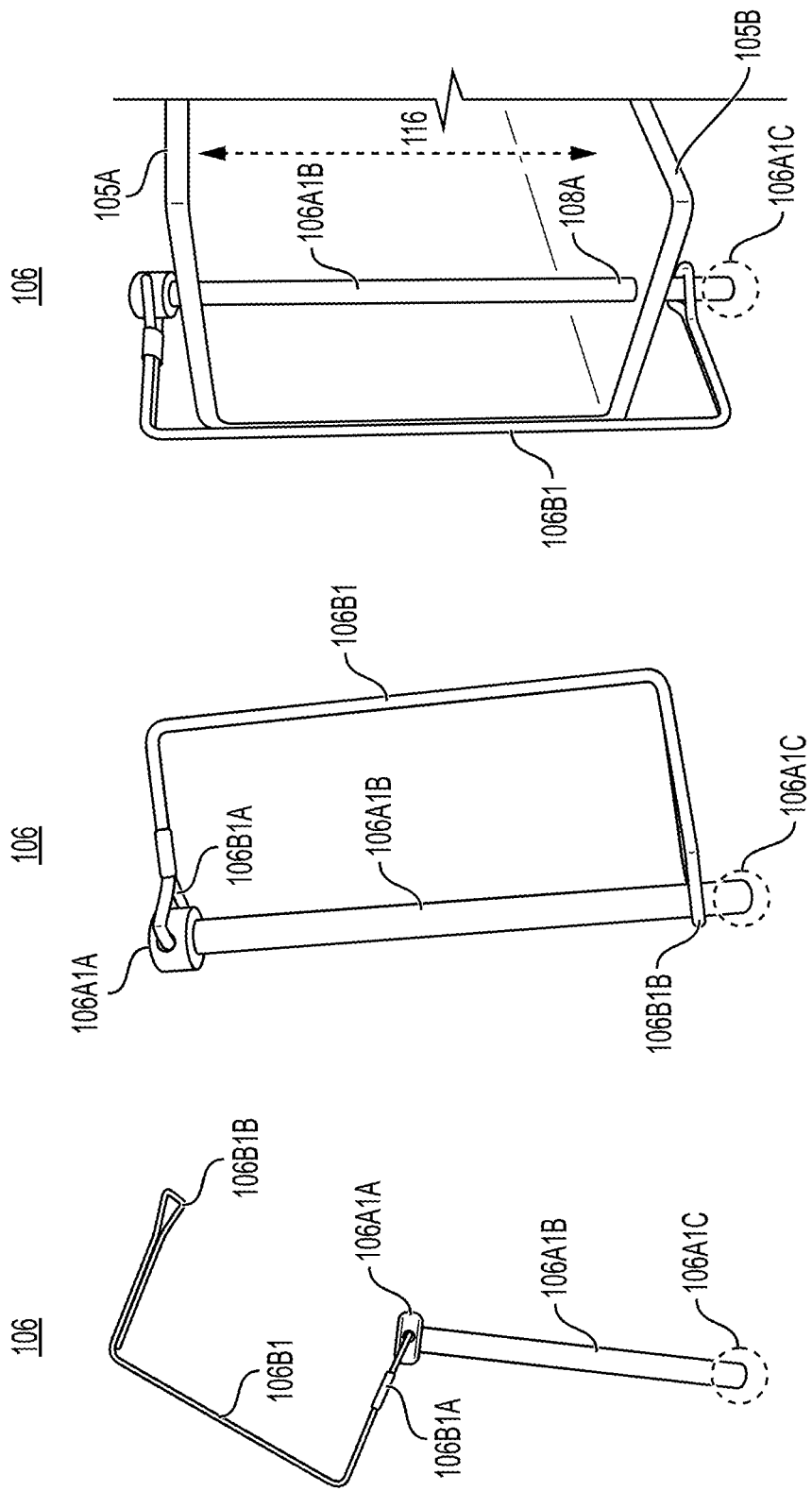

LADDER-SECURING BRACKET ASSEMBLY FOR A VEHICLE

CROSS-REFERENCE TO RELATED APPLICATIONS

None.

FIELD OF TECHNOLOGY

The present technology relates to vehicle article holders/carriers and, more particularly, to a vehicle ladder support assembly.

BACKGROUND

Conventional article holder or carrier structures for vehicles are generally constructed to support a wide range of articles. Due to this broad design objective, conventional holders/carrier structures typically employ numerous adjustable and interacting parts that need to be assembled in order accommodate the varying sizes of articles to be carried, which increases the complexity of installation and operation as well as manufacturing costs. In addition, conventional holders/carrier structures often occupy a substantial surface area of a vehicle, which decreases the useable space for other articles to be transported.

With this said, a common article that is supported by vehicular holders/carrier structures is a ladder. However, due to the dimensions of standard ladders, namely, length, lateral narrowness, and thin profile, conventional holders/carrier structures often require additional measures to adequately and safely secure standard ladders to a vehicle.

Therefore, there exists continued interest in developing a vehicle ladder securing structure that is simple to use and install, employs minimal parts, occupies a reduced surface area, and is relatively inexpensive to manufacture.

SUMMARY

It is an overall object of the embodiments of the present technology to provide a ladder securing structure for a plane surface of a vehicle.

In accordance with an embodiment of the present technology, there is provided a ladder-securing assembly for a vehicle that comprises a bracket configured with a square U-shaped cross-sectional profile and a lateral width sized to accommodate a width of at least one rung of a standard ladder, in which the bracket includes a top surface configured with top side retention holes to respectively receive retention pins inserted therethrough; a bottom surface configured with bottom side retention holes to respectively receive the retention pins inserted therethrough and attachment holes to respectively accommodate bolts for fixedly attaching the bracket to a plane surface of the vehicle; a spacing arranged between the top and bottom surfaces and spanning across the lateral width of the bracket, the spacing configured to slidably receive the at least one rung of the standard ladder; and a retention pin structure containing retention pin holders configured to releasably lock the retention pins inserted through the top side and bottom side retention holes of the bracket to secure the at least one ladder rung in place.

In some aspects, the retention pins comprise a disk-shaped head disposed on an upper end of the retention pins, the disk-shaped head configured with a fastening hole therethrough; and a rod body configured to be inserted through the top side and bottom side retention holes of the bracket.

Moreover, the retention pin holders manifest a square U-shape configuration containing first and second leg members and further include a first eyelet clip disposed on an end of the first leg member and configured to be inserted into the fastening hole of the disk-shaped head to enable the retention pin holder to hingedly rotate about the fastening hole axis; and a second eyelet clip disposed on an end of the second leg member and configured to receive a distal end of the rod body therethrough.

Additionally, the retention pin holders are configured with sufficient elasticity to enable the second leg member to be stretched length-wise such that the second eyelet clip is able to receive the distal end of the rod body and then spring back to its original length to secure the at least one ladder rung in place.

Within the context of the present specification, unless expressly provided otherwise, the words "first", "second", "third", etc. have been used as adjectives only for the purpose of allowing for distinction between the nouns that they modify from one another, and not for the purpose of describing any particular relationship between those nouns.

Furthermore, the phrase "at least one of A and B" is intended to mean A only, B only or both A and B.

Additional and/or alternative features, aspects and advantages of embodiments of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description that is to be used in conjunction with the accompanying drawings, in which:

FIGS. 2B, 2C, and 2D depict various views of retention pin holder configuration, in accordance with the non-limiting embodiments of the present technology.

It should be noted that, unless otherwise explicitly specified herein, the drawings are not necessarily to scale. Moreover, the drawings may omit certain features or and may exaggerate certain features to assist in the understanding of the disclosed embodiments.

DETAILED DESCRIPTION

Figure 1:
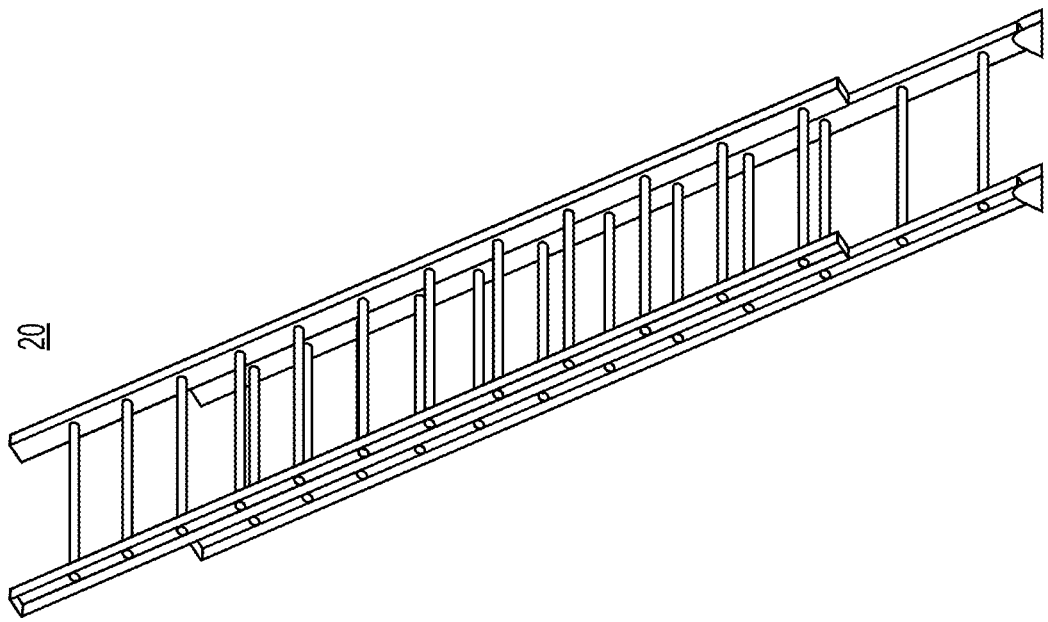
FIG. 1 (Prior Art) depicts configurations of various standard ladders.
Figure 1:
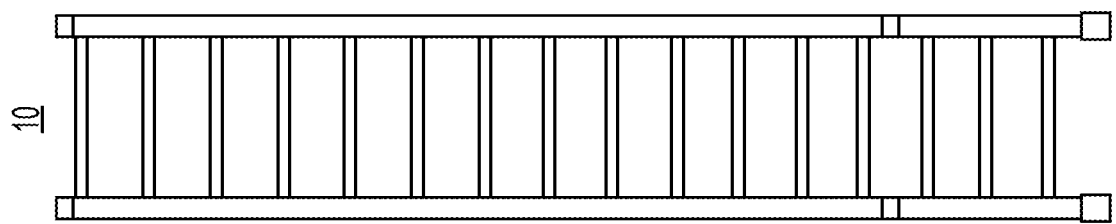

The non-limiting embodiments of the present technology will be described herein with respect to a ladder-securing assembly for a vehicle to accommodate support of a standard ladder during transport. As shown in FIG. 1, standard ladders may take the form of a straight ladder 10 or an extension ladder 20. For consumer safety purposes, standard ladders must comply with specifications provided by standards bodies, such as, for example, OSHA 1926.1053, EN ISO 14122-4, etc.

Figure 2A:
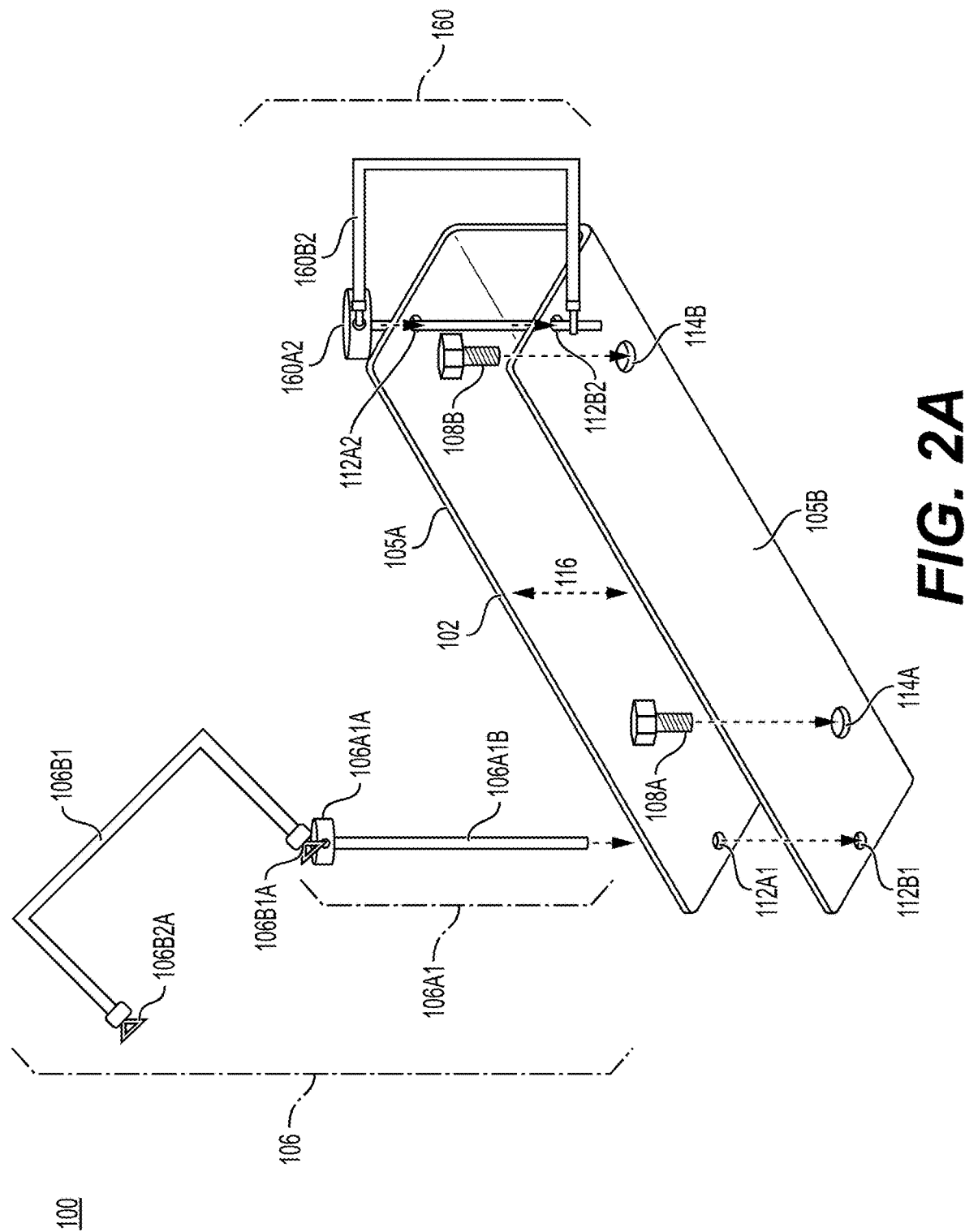
FIG. 2A depicts a perspective view of a ladder-securing assembly, in accordance with the non-limiting embodiments of the present technology.

With this said, FIG. 2A depicts a perspective view of a ladder-securing assembly 100, in accordance with the non-limiting embodiments of the present technology. As shown, ladder-securing assembly 100 comprises a bracket 102 containing a first and second retention pin structure 106, 160. FIG. 2A depicts the constituent components of the first retention pin structure 106 in an "uninstalled" state that comprises retention pin holder 106B1 and retention pin 106A1, in which these constituent components will be described below in detail. FIG. 2A also depicts the second retention pin structure 160 in an "installed" state, wherein the constituent components thereof are identical to the components of the first retention pin structure 106. Therefore, for ease of understanding, the detailed description of the first retention pin structure 106 is to be understood to apply equally to the second retention pin structure 160 and its constituent components.

In particular, bracket 102 is designed to be fixedly attached to a plane surface of the vehicle. The vehicle plane surface may comprise a vehicle roof, a vehicle bed, a vehicle trailer, a vehicle rack structure or any suitable sturdy vehicular surface capable of supporting the weight and accommodating the space of a standard ladder. Moreover, for ladders that significantly long, it is envisioned more than one bracket 102 may be installed.

As such, bracket 102 is configured with a square U-shaped cross-sectional profile while having a lateral width that is sized to accommodate the width of a standard ladder rung. The bracket 102 is constituted of a sturdy, high tensile strength material, such as, for example, iron, steel, aluminum, polycarbonate (PC), poly-methacrylic (PMMA), aluminum composite (ACM) or any similar material sturdy enough to safely secure the standard ladder during transit.

The bracket 102 comprises a top surface 105A, spanning the lateral width of the bracket 102, that includes top side retention holes 112A1, 112A2 to respectively receive the upper ends of the retention pin 106A1 to be inserted therethrough. The top side retention holes 112A1, 112A2 are respectively disposed on opposite lateral ends of the top surface 105A.

The bracket 102 also comprises a bottom surface 105B, in parallel arrangement with the top surface 105A, that contains bottom side retention holes 112B1, 112B2 to respectively receive lower ends of the retention pin 106A1 to be inserted therethrough. The bottom side retention holes 112B1, 112B2 are also respectively disposed opposite lateral ends of the bottom surface 105B so as to be vertically-aligned with the top side retention holes 112A1, 112A2. The bottom surface 105B also includes attachment holes 114A, 114B that are laterally spaced apart to respectively accommodate bolts 108A, 108B for fixedly attaching the bracket 102 to the vehicle plane surface.

The bracket 102 further comprises a spacing 116 arranged between the top and bottom surfaces 105A, 105B and spanning across the lateral width of the bracket 102. The bracket spacing 116 also comprises a depth size that is perpendicularly-oriented to the lateral width of the bracket 102, in order to slidably-receive and accommodate the single/double rungs of the standard ladder.

As such, upon fixedly attaching the bracket 102 to the vehicle plane surface via bolts 108A, 108B, the bracket 102 is spatially arranged such that the top surface 105A is oriented vertically upwards relative to the vehicle plane surface and the bracket spacing 116 is oriented horizontally parallel to the vehicle plane surface. This spatial arrangement facilitates the sliding of the single rung/double rungs into the bracket spacing 116 of bracket 102.

Returning to FIG. 2A, retention pin structure 106 (and 160) includes retention pin holder 106B1, and retention pin 106A1. The retention pin 106A1 comprises a disk-shaped head 106A1A disposed on an upper end of the retention pins, in which the disk-shaped head 106A1A includes a fastening hole bored therethrough. The retention pin 106A1 further comprises a rod body 106A1B configured to be inserted through the top side and bottom side retention holes 112A1, 112B1 (as well as retention holes 112A2, 112B2 for receiving retention pin 160A2) of bracket 102. The vertical length of the retention pins 106A1 is configured to extend beyond the bottom surface 105B of bracket 102, such that a protruding portion 106A1C of the distal end of the rod body 106A1B protrudes beyond the bottom surface 105B (see, e.g., FIG. 2D).

The retention pins 106A1, 160A2 are constituted of a high tensile strength material, such as, for example, iron, steel, aluminum, or an alloy composite thereof.

The retention pin holders 106B1, 160B2 are configured to releasably lock the retention pins 106A1, 160A2 that are inserted through the top and bottom side retention holes 112A1, 112A2, 112B1, 112B2 of the bracket 102 to maintain and secure the single rung/double rungs of the standard ladder in place.

Accordingly, the retention pin holder 106B1, 160B2 manifests a square U-shape configuration containing first and second leg members. The first leg member comprises a first eyelet clip 106B1A disposed on an end of the first leg member and configured to be inserted into the fastening hole of the disk-shaped head 106A1A to enable the retention pin holder 106B1, 106B2 to hingedly rotate about the axis of the fastening hole.

Similarly, the second leg member comprises a second eyelet clip 106B1B disposed at an end of the second leg member. The second eyelet clip 106B1B is configured to receive the distal end of the rod body 106A1B therethrough. As shown, both the first and second eyelet clips 106B1A, 106B1B manifest a triangular shape although other shapes, such as, for example, circular, rectangular, square are also contemplated.

The vertical span of the retention pin holders 106B1, 160B2 is configured to be shorter than the vertical length of the retention pins 106A1, 160A2, such that the second eyelet clip 106B1B abuts or comes substantially close to abutting the bottom surface 105B of bracket 102. Therefore, as best seen in FIG. 2D, the protruding portion 106A1C of the rod body 106A1B protrudes beyond both, the bottom surface 105B and the second eyelet clip 106B1B.

With this configuration, the retention pin holder 106B1, 160B2 is configured with sufficient elasticity to enable the second leg member to be stretched length-wise such that the second eyelet clip 106B1B is able to receive the distal end of the rod body 106A1B and then spring back to its original length to secure the single rung/double rungs of the standard ladder in place. As such, the retention pin holder 106B1, 160B2 is constituted of a material, such as, for example, iron, steel, aluminum, or an alloy composite thereof having sufficient elasticity to enable the second leg member to be stretched length-wise and spring back to its original length.

Therefore, in "closing" operations, the second leg member of the retention pin holder 106B1, 160B2 is stretched length-wise in a downward direction to enable the second eyelet clip 106B1B to pass beyond the end of the protruding portion 106A1C, allow the second eyelet clip 106B1B to engage the protruding portion 106A1C, and then spring up so that the second eyelet clip 106B1B abuts (or comes close to abutting) the bottom surface 105B. In this manner, the retention pins 106A1, 160A2 inserted through the top and bottom side retention holes 112A1, 112A2, 112B1, 112B2 are securely held in place by the retention pin holder 106B1, 160B2.

Inversely, for "opening" operations, the second leg member of the retention pin holder 106B1, 160B2 is again stretched length-wise in a downward direction to enable the second eyelet clip 106B1B to pass beyond the end of the protruding portion 106A1C, disengage the second eyelet clip 106B1B from the protruding portion 106A1C, and then spring back to its normal length so that retention pin holder 106B1, 160B2 can be hingedly swung away from the inserted retention pins 106A1, 106A2.

By way of illustration, FIGS. 2B, 2C, 2D depict various operational states of retention pin structure 106. In particular, FIG. 2B depicts the retention pin structure 106 in the open (uninstalled) state, in which the retention pin holder 106B1 is hingedly swung away from the retention pin 106A1. FIG. 2C depicts the retention pin structure 106 in the closed (uninstalled) state, in which the second eyelet clip 106B1B of the second leg member of retention pin holder 106B1 has engaged the retention pin 106A1.

Relatedly, FIG. 2D depicts the retention pin structure 106 in the closed (installed) state, in which the second eyelet clip 106B1B has engaged the retention pin 106A1, such that the second eyelet clip 106B1B abuts the bottom surface 105B of the bracket 102 with the protruding portion 106A1C extending beyond the second eyelet clip 106B1B.

Figure 3:
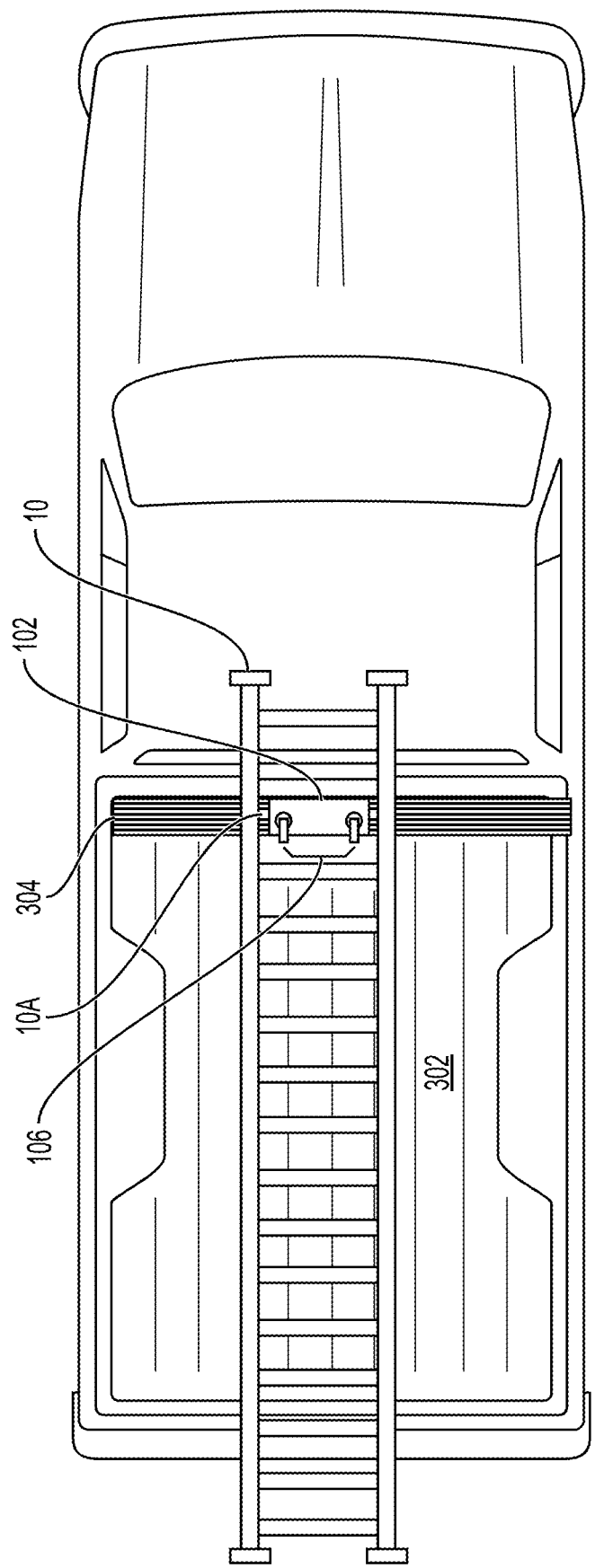
FIG. 3 depicts a top view of a representative installation of the ladder-securing assembly on a pickup truck, in accordance with the non-limiting embodiments of the present technology.

Finally, FIG. 3 illustrates a top view (not to scale) of a representative installation of the ladder-securing assembly bracket 102 on a pickup truck 300, in accordance with the non-limiting embodiments of the present technology.

Specifically, FIG. 3 depicts a standard straight ladder 10 carried in the cargo bed area 302 of the pickup truck 300 for transport. As shown, pickup truck 300 incorporates a vehicle rack structure 304 in the cargo bed area 302 to support ladder 10. It should be appreciated that the position and configuration of the depicted rack structure 304 is not limiting, as other rack configurations and positions within the cargo bed area are envisioned.

While not visible, the bottom surface 105B of bracket 102 is fixedly mounted to an upper surface of the vehicle rack structure 304 via bolts 108A, 108B, such that rung 10A can be slid into the horizontally-oriented spacing 116 of bracket 102, as discussed above. With the rung 10A in place, the retention pin structures 106, 160 insert the retention pins 106A1, 160A2 in the corresponding retention holes 112A1, 112A2, 112B1, 112B2 and the retention pin holders 106B1, 160B2 are closed by engaging the retention pins 106A1, 106A2 to securely lock them in place.

While not to scale, FIG. 3 demonstrates that ladder-securing assembly 100 is relatively compact in design thereby providing more useable space for other articles during transport.

In this manner, the disclosed embodiments provide a ladder-securing assembly for a vehicle that releasably locks and secures ladders into place during transport. Moreover, the disclosed embodiments provide a ladder-securing assembly design that is compact, simple to install and use and requires minimal parts.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

What is claimed:

1. A ladder-securing assembly for a vehicle, comprising:
a bracket configured with a square U-shaped cross-sectional profile and a lateral width sized to accommodate a width of at least one rung of a standard ladder, the bracket comprising:
    a top surface configured with top side retention holes to respectively receive retention pins inserted therethrough;
    a bottom surface configured with bottom side retention holes to respectively receive the retention pins inserted therethrough and attachment holes to respectively accommodate bolts for fixedly attaching the bracket to a plane surface of the vehicle, wherein the bottom surface is planar with the plane surface of the vehicle, and wherein the retention pins comprise a disk-shaped head disposed on an upper end of the retention pins, the disk-shaped head configured with a fastening hole therethrough, and a rod body configured to be inserted through the top side and bottom side retention holes of the bracket;
    a spacing arranged between the top and bottom surfaces and spanning across the lateral width of the bracket, the spacing configured to slidably receive the at least one rung of the standard ladder; and
    a retention pin structure containing retention pin holders configured to releasably lock the retention pins inserted through the top side and bottom side retention holes of the bracket to secure the at least one rung in place, wherein the retention pin holders have a square U-shape configuration containing first and second leg members, and wherein the retention pin holders comprise:
        a first eyelet clip disposed on an end of the first leg member and configured to be inserted into the fastening hole of the disk-shaped head to enable the retention pin holder to hingedly rotate about an axis of the fastening hole, and
        a second eyelet clip disposed on an end of the second leg member and configured to receive a distal end of the rod body therethrough.

2. The ladder-securing assembly of claim 1 wherein, upon fixedly attaching the bracket to the plane surface of the vehicle via bolts, the bracket is spatially arranged such that the top surface is oriented vertically upwards relative to the plane surface of the vehicle and the spacing is oriented horizontally parallel to the plane surface of the vehicle.

3. The ladder-securing assembly of claim 1, wherein the plane surface of the vehicle includes at least one of a vehicle roof, a vehicle bed, a vehicle trailer, and a vehicle rack structure.

4. The ladder-securing assembly of claim 1, wherein the spacing is configured with a depth size, perpendicularly-orientated to the lateral width of the bracket, to accommodate a single rung and/or double rungs of the standard ladder.

5. The ladder-securing assembly of claim 1, wherein the retention pin holders are configured with sufficient elasticity to enable the second leg member to be stretched length-wise such that the second eyelet clip is able to receive the distal end of the rod body and then spring back to its original length to secure the at least one ladder rung in place.

6. The ladder-securing assembly of claim 1, wherein a material constituting the bracket includes at least one of iron, steel, aluminum, polycarbonate (PC), poly-methacrylic (PMMA), and aluminum composite (ACM).

7. The ladder-securing assembly of claim 1, wherein a material constituting the retention pins includes at least one of iron, steel, and aluminum.

8. The ladder-securing assembly of claim 1, wherein a material constituting the retention pin holders includes at least one of iron, steel, and aluminum having sufficient elastic properties to enable the second leg member to be stretched length-wise and spring back to its original length.

9. The ladder-securing assembly of claim 1, wherein the first and second eyelet clips comprise a triangular shape.

* * * * *